United States Patent [19]

Lindsay

[11] Patent Number: 4,823,384
[45] Date of Patent: Apr. 18, 1989

[54] TELEPHONE APPARATUS FOR THE HEARING IMPAIRED

[75] Inventor: Stephen L. Lindsay, Livonia, Mich.
[73] Assignee: Lindsay H. Industries, Inc., Novi, Mich.
[21] Appl. No.: 137,875
[22] Filed: Dec. 24, 1987
[51] Int. Cl.⁴ .................... H04M 1/00; H04M 11/00
[52] U.S. Cl. .................................. 379/441; 379/52; 379/447; 379/450
[58] Field of Search ............... 379/52, 433, 439, 441, 379/447, 450, 452; 381/153, 157, 159; 181/242

[56] References Cited

U.S. PATENT DOCUMENTS

| | | | |
|---|---|---|---|
| 366,994 | 7/1887 | Bradford | 379/452 |
| 546,972 | 9/1895 | Gerson | 181/22 |
| 935,274 | 9/1909 | Schilling | 379/452 |
| 1,575,575 | 3/1926 | Guerrant | 379/444 |
| 1,615,028 | 1/1927 | Morser | 381/205 |
| 1,823,705 | 9/1931 | Smith . | |
| 2,985,724 | 5/1961 | Sickelsmith et al. | 379/450 |
| 3,072,755 | 1/1963 | Kuhberg | 379/430 |
| 3,231,688 | 1/1966 | Ugartechea | 379/447 |
| 3,301,955 | 1/1967 | Clements, Jr. | 379/443 |
| 3,319,003 | 5/1967 | Prager | 379/448 |
| 4,185,175 | 1/1980 | Kondo et al. | 379/450 |

FOREIGN PATENT DOCUMENTS

| | | | |
|---|---|---|---|
| 13418 | 6/1899 | United Kingdom | 381/157 |
| 253393 | 6/1926 | United Kingdom | 379/444 |
| 2154390A | 9/1985 | United Kingdom | 379/444 |

OTHER PUBLICATIONS

Hearing Instruments, vol. 37, No. 6, 1986, p. 37-Telephone Coupler.

Primary Examiner—Jin F. Ng
Assistant Examiner—Bonita F. Lewis
Attorney, Agent, or Firm—Harness, Dickey & Pierce

[57] ABSTRACT

A telephone accessory for use by hearing impaired individuals wearing hearing aids which enables a conventional telephone to be used without causing annoying feedback. The telephone accessories include a deeply-dished ear horn portion which reduces feedback problems since the sound reflective surfaces of the ear horn are displaced some distance from the hearing aid microphone. Various embodiments of this invention are described including alternate means for retaining the device attached to a telephone handset, and several embodiments disclosing means for varying the depth of the ear horn cup to suit an individual user.

14 Claims, 2 Drawing Sheets

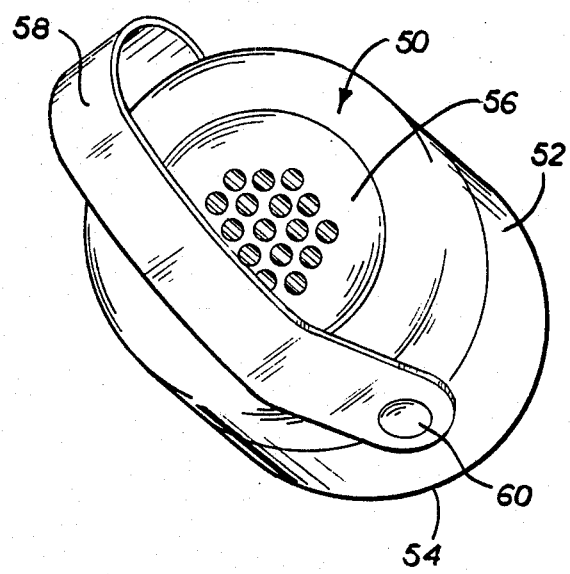
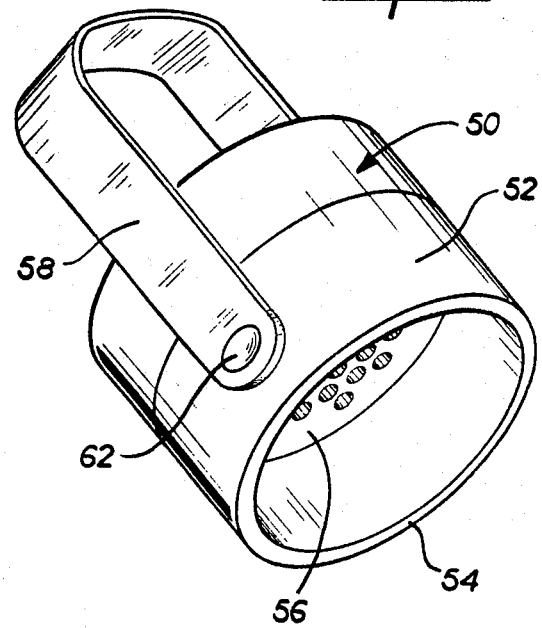
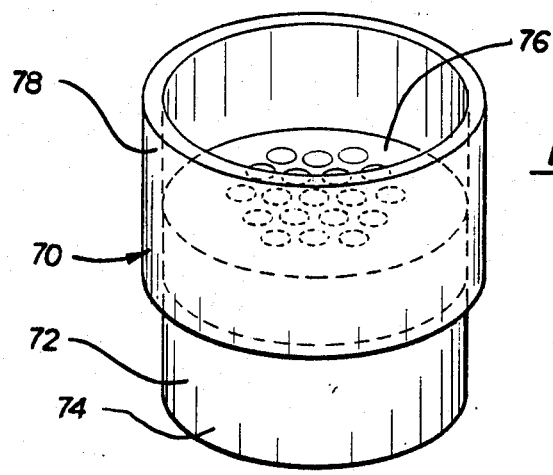
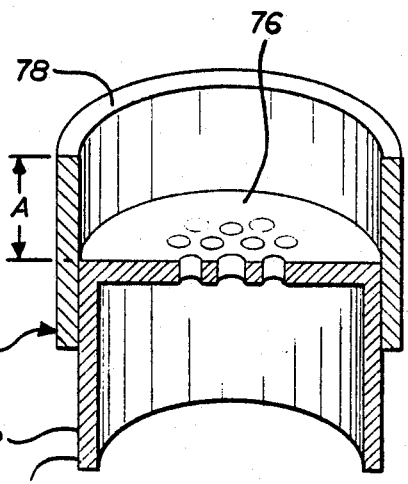
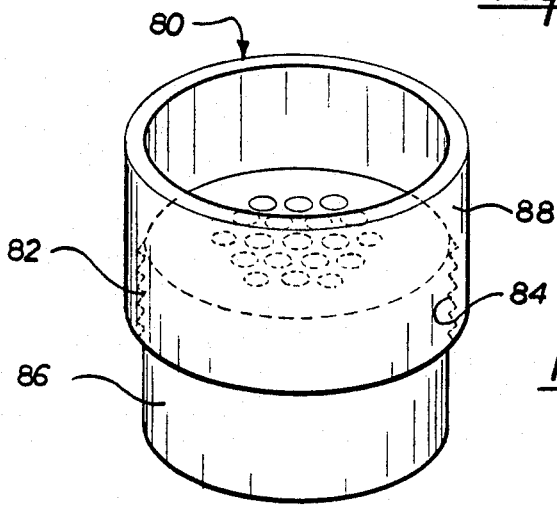

TELEPHONE APPARATUS FOR THE HEARING IMPAIRED

BACKGROUND AND SUMMARY OF THE INVENTION

This invention relates to a telephone accessory, and particularly to one that enables individuals wearing hearing aids to conveniently use a conventional telephone.

Hearing impaired individuals are frequently able to obtain near-normal hearing through the use of hearing aids which amplify sounds. Numerous types of hearing aids are known, but the type in most prevalent use today are the so-called "in-ear" types, which resemble an ear plug inserted into the ear canal and are small and inconspicuous. Modern hearing aids contain a microphone and internally disposed battery and amplification circuits and have a sound emitter within the ear canal. Although these devices generally operate satisfactorily for normal hearing conditions, users of such hearing aids often encounter difficulty when using conventional telephones. When the telephone earpiece is brought close to the hearing aid, a high pitched squealing sound is generated due to feedback. This effect can be demonstrated by putting a sound reflective surface close to the wearer's ears. Feedback occurs since the output of the hearing aid emitter becomes closely coupled with its microphone when the hard surface such as a telephone earpiece reflects sound from the emitter back to the microphone. Due to the presence of such feedback, many users of hearing aids must use a dedicated telephone amplifying device rather than their hearing aid. The requirement for an amplified telephone is an inconvenience and is an additional expense.

In accordance with the present invention, an add-on accessory device is provided for a telephone earpiece which is inexpensive and has no moving parts and enables a conventional telephone to be used in the normal manner by a hearing impaired individual wearing a hearing aid. The devices according to the invention provide a deep cup which is attached to the telephone earpiece and directs the emitted sound to the user's ear but does not present a flat sound reflective surface in close proximity to the hearing aid. Accordingly, with the add-on accessory device in place, a conventional telephone can be used without feedback. Various embodiments of such accessory devices are described herein which include various means for attaching the device to a telephone, and includes embodiments which are readily adaptable to various users by enabling the depth of the cup to be adjusted.

Additional benefits and advantages of the present invention will become apparent to those skilled in the art to which this invention relates from the subsequent description of the preferred embodiments and the appended claims, taken in conjunction with the accompanying drawings.

DESCRIPTION OF DRAWINGS

FIG. 6 is a pictorial view of a telephone accessory in accordance with a fourth embodiment of this invention employing a strap for retention of the device to a telephone handset.

FIG. 7 is another pictorial view of the device shown in FIG. 6.

FIG. 8 is a pictorial view of a telephone accessory in accordance with a fifth embodiment of this invention which includes means for varying the depth of the earcup to suit individual users.

FIG. 9 is a partially pictorial and a partially sectional view of the telephone accessory shown in FIG. 8.

FIG. 10 is a telephone accessory in accordance with a sixth embodiment of this invention which is generally similar to that shown in FIG. 8, except providing an alternate means for varying the depth of the earcup.

DETAILED DESCRIPTION OF THE INVENTION

Figure 1:
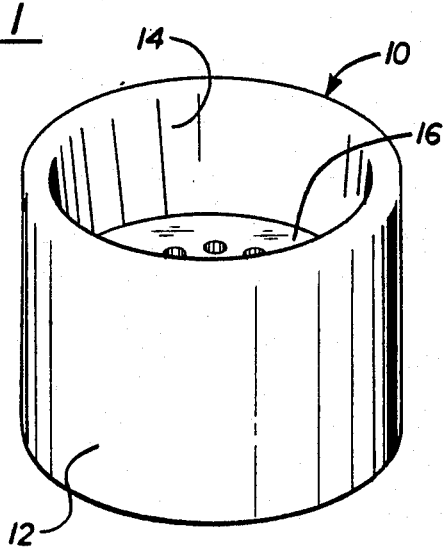
FIG. 1 is a pictorial view of a first embodiment of a telephone accessory according to a first embodiment of this invention.
Figure 2:
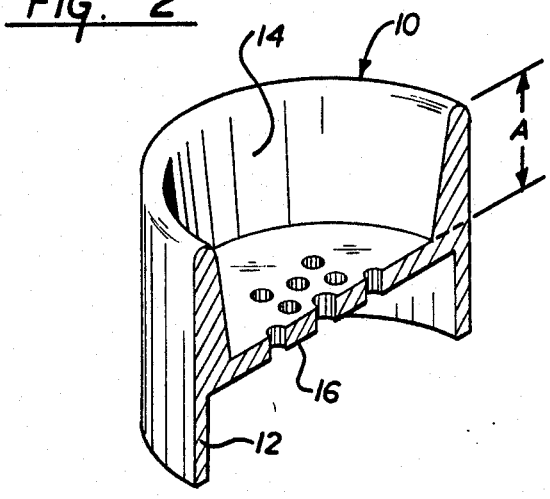
FIG. 2 is a partial pictorial and cross-sectional view of the telephone accessory shown in FIG. 1.
Figure 3:
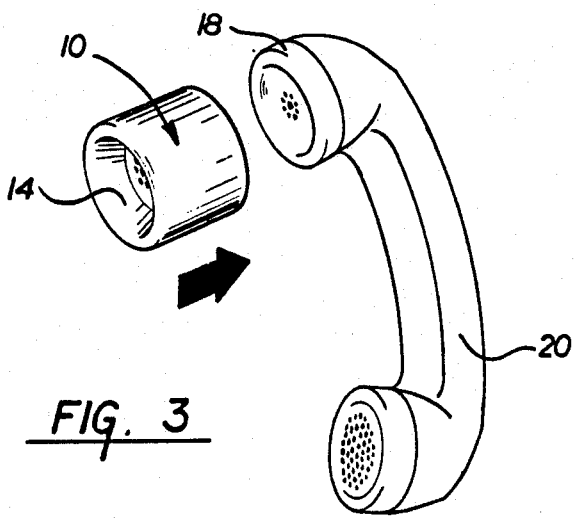
FIG. 3 is a pictorial view of the device shown in FIG. 1 being mounted to a telephone handset.

A telephone accessory in accordance with a first embodiment of this invention is shown in FIG. 1 and is generally designated by reference number 10. As shown, telephone accessory 10 is tubular in shape and has skirt portion 12, a tubular ear horn portion 14, with perforated partition 16 separating those two portions. The inside diameter of skirt portion 12 is selected to enable it to frictionally engage the earpiece cup 18 of telephone handset 20 as shown in FIG. 3. In accordance with a principal feature of this invention, the depth of ear horn portion 14, identified by dimension A in FIG. 2 is between one-half and two inches which has been found by this inventor to provide the desirable features described herein. In one experimental embodiment of telephone accessory 10, a depth of seven-eighths of an inch was found ideal.

Telephone accessory 10 enables a conventional telephone handset 20 to be used by hearing impaired individuals wearing hearing aids without causing annoying feedback. The accessory according to this invention avoids feedback which ordinarily occurs when a telephone is brought close to a hearing aid by moving the sound reflective surface of the earpiece cup from directly in proximity to the hearing aid, to a stand-off distance identified by the dimension A. This stand-off distance prevents the sound output from the hearing aid and the microphone from being coupled sufficiently to cause feedback problems.

FIG. 3 illustrates installation of telephone accessory 10 onto telephone handset earpiece cup 18 where it remains in position through frictional engagement. Telephone accessory 10 can be carried by the hearing impaired individual who merely attaches it to any nearby telephone which he or she might want to use. The configuration of telephone accessory 10 shown in FIGS. 1 through 3 is particularly adapted for the traditional configuration for an AT&T telephone handset, and can be adapted for use with other telephone configurations.

Figure 4:
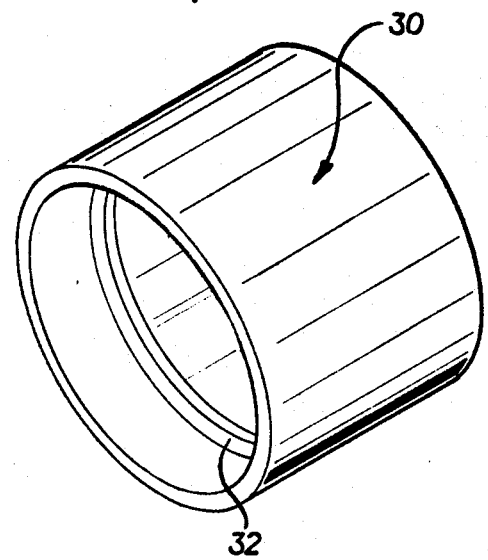
FIG. 4 is a pictorial view of a telephone accessory according to a second embodiment of this invention.

FIG. 4 illustrates accessory 30 according to a second embodiment of this invention. Accessory 30 is similar to accessory 10 except that partition 16 is eliminated and replaced with flange 32 which serves to establish the depth of skirt portion 12. For this embodiment, dimension A would be measured from the end of ear horn portion 14 to the surface of earpiece cup 18 once accessory 30 is mounted.

Figure 5:
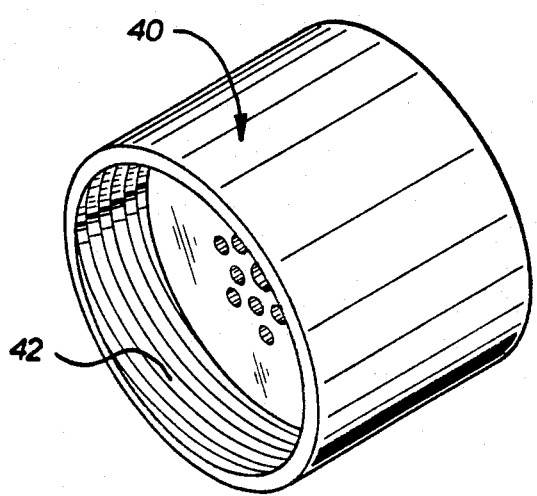
FIG. 5 is a third embodiment of the telephone accessory according to this invention similar to the device shown in FIG. 1 except that internal threads are provided to enable mounting to a conventional telephone handset after the earpiece cap is removed.

FIG. 5 illustrates third embodiment of a telephone accessory according to this invention which is generally designated by reference number 40. Telephone accessory 40 is identical to telephone accessory 10 except that the inside surface of skirt portion 12 forms internal threads 42. Threads 42 have a profile and pitch which enables them to mesh with the standard thread configuration on telephone handset 20 when earpiece cup 18 is unthreaded and removed from the handset. Telephone accessory 40 therefore does not rely upon frictional engagement with the telephone and is consequently more securely fastened to the telephone handset. Use of telephone accessory 40, however, requires additional time since earpiece cup 18 must be removed and the device installed onto the handset FIGS. 6 and 7 illustrate a fourth embodiment of a telephone accessory according to this invention, designated by reference number 50. Telephone accessory 50 has a generally cylindrical body 52 having a hollow ear horn end 54. The opposite end of body 52 is enclosd by perforated partition 56. Retention strap 58 is fastened to body 52 by posts 60 and 62 and is preferably made from an elastic material. Retention strap 58 is configured to permit it to loop over the back of telephone handset 20 and thus the strap acts to retain telephone accessory 50 in the proper position overlying earpiece cup 18. This embodiment illustrates still another means for retaining a telephone accessory in accordance with this invention in position on the telephone handset.

FIGS. 8 and 9 illustrate a telephone accessory 70 in accordance with a fifth embodiment of this invention, which incorporates means for varying the depth of the ear horn portion, designated by dimension A, to suit the needs of a particular user. Telephone accessory 70 includes a smaller diameter tubular section 72 having a hollow skirt 74 and a perforated partition end 76. The inside diameter of skirt 74 is dimensioned to frictionally engage earpiece cup 18, as explained in connection with telephone accessory 10 in accordance with the first described embodiment of this invention. Outer tubular member 78 frictionally engages tubular section 72 such that the sections can be telescoped to vary the length of dimension A, as shown in FIG. 9. This version enables individuals with various types of hearing aids and degrees of amplifier gain to adjust the device to their particular needs.

FIG. 10 illustrates telephone accessory 80 according to a sixth embodiment of this invention which is substantially identical to telephone accessory 70 shown in FIGS. 8 and 9, except that the distance of dimension A is not adjusted by frictional engagement between tubular members, but rather through meshing between the two threaded surfaces 82 and 84 of tubular portions 86 and 88, respectively. Otherwise, telephone accessory 80 operates in a manner identical to that of telephone accessory 70.

While the above description constitutes the preferred embodiments of the present invention, it will be appreciated that the invention is susceptible to modification, variation and change without departing from the proper scope and fair meaning of the accompanying claims.

I claim:

1. A telephone accessory for attachment to a telephone handset earpiece for use by hearing impaired individuals while wearing a hearing aid, said telephone earpiece having an outer surface for emitting sound and for placement in direct proximity to the user's ear, comprising:

a body having means for attachment to the telephone handset earpiece, and an ear horn portion of said body having an upstanding cylindrical wall forming an open end, said cylindrical wall extending from said outer surface when said accessory is mounted to the telephone handset earpiece, said cylindrical wall substantially covering the user's ear when the telephone handset earpiece is positioned adjacent the user's ear, said ear horn portion having a depth measured from said open end to said earpiece outer surface of at least one-half inch whereby said ear horn portion permits said handset to be used by a hearing impaired individual without causing feedback of said hearing aid.

2. A telephone accessory according to claim 1 wherein said means for attachment comprises a tubular skirt portion which frictionally engages the telephone handset earpiece.

3. A telephone accessory according to claim 1 wherein said body further forms a partition which forms an end of said cylindrical wall opposite said cylindrical wall open end wherein said depth is measured from said open end to said partition.

4. A telephone accessory according to claim 3 wherein said partition is perforated.

5. A telephone accessory according to claim 1 further comprising a radially inward projecting flange defining an end of said cylindrical wall opposite said open end wherein said depth is measured from said open end to said telephone handset earpiece outer surface.

6. A telephone accessory according to claim 1 wherein said means for attachment comprises threads formed by said body for meshing with threads on said telephone handset.

7. A telephone accessory according to claim 1 wherein said means for attachment comprises a strap attached to said body for engaging the telephone handset.

8. A telephone accessory according to claim 1 wherein said ear horn depth is less than two inches.

9. A telephone accessory according to claim 1 wherein said ear horn depth is about seven-eighths inch.

10. A telephone accessory according to claim 1 wherein said ear horn portion is defined by a first cylindrical tube, and a second cylindrical tube defines said body, and wherein said first and second cylindrical tubes are telescopingly slidable to vary the depth of said ear horn portion.

11. A telephone accessory according to claim 10 wherein said first and second cylindrical tubes have threads which mesh together whereby relative rotation therebetween causes said ear horn depth to change.

12. A telephone accessory for attachment to a telephone handset earpiece for use by hearing impaired individuals while wearing a hearing aid, said telephone earpiece having an outer surface for placement in direct proximity to the user's ear, said accessory comprising:

a first tubular member having a perforated partition enclosing one end thereof, and having an open opposite end, said first tubular member adapted for mounting to said telephone handset earpiece such that said partition covers said earpiece outer surface, and a second tubular member receiving said first tubular member and having an outward projecting open end which substantially covers the user's ear when the telephone handset is positioned adjacent the user's ear, said second tubular member forming an ear horn portion wherein the depth of said ear horn portion measured between said partition and the outward projecting end of said second tubular portion is adjustable whereby said ear horn depth can be adjusted to minimize feedback of the hearing aid when said accessory is attaached to the telephone.

13. An accessory according to claim 12 wherein said first and second tubular members frictionally engage each other.

14. An accessory according to claim 12 wherein said first and second tubular members are threaded together whereby relative rotation therebetween causes said ear horn portion depth to change.

* * * * *